July 14, 1953

P. STABILE 2,645,367

POWER-DRIVEN AUTOMOBILE LIFT

Filed April 7, 1948

INVENTOR.
Peter Stabile
BY
Abraham Aaron
ATTORNEY.

July 14, 1953  P. STABILE  2,645,367
POWER-DRIVEN AUTOMOBILE LIFT
Filed April 7, 1948  4 Sheets-Sheet 2
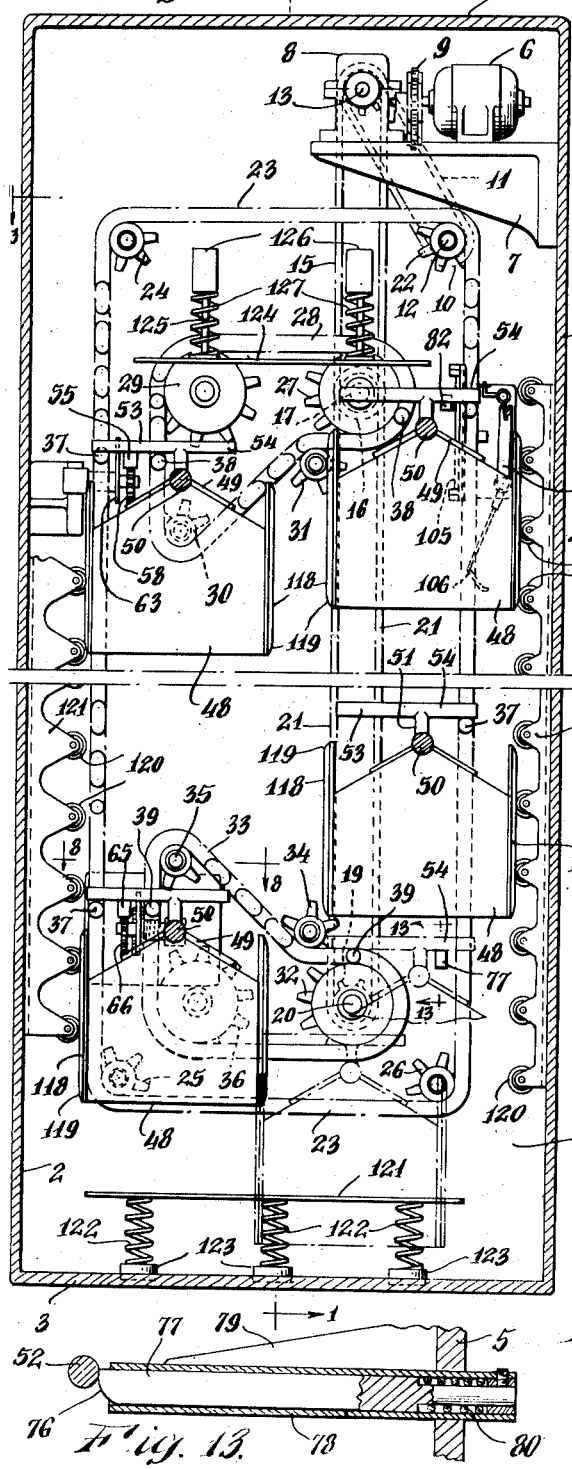
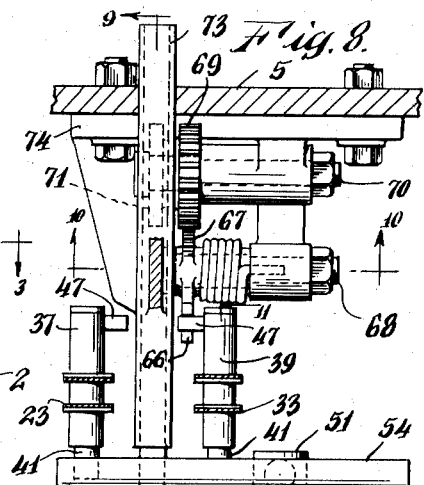
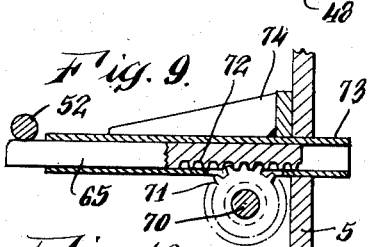
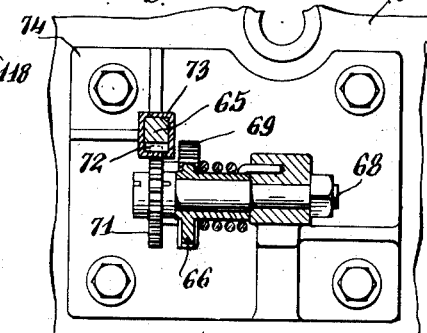
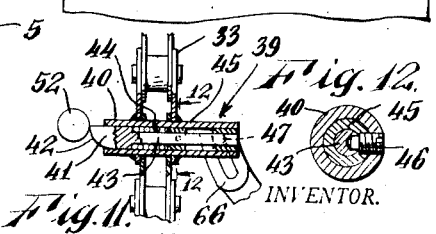
INVENTOR.
Peter Stabile
BY Abraham Aaron
ATTORNEY.

July 14, 1953      P. STABILE      2,645,367
POWER-DRIVEN AUTOMOBILE LIFT
Filed April 7, 1948      4 Sheets-Sheet 3
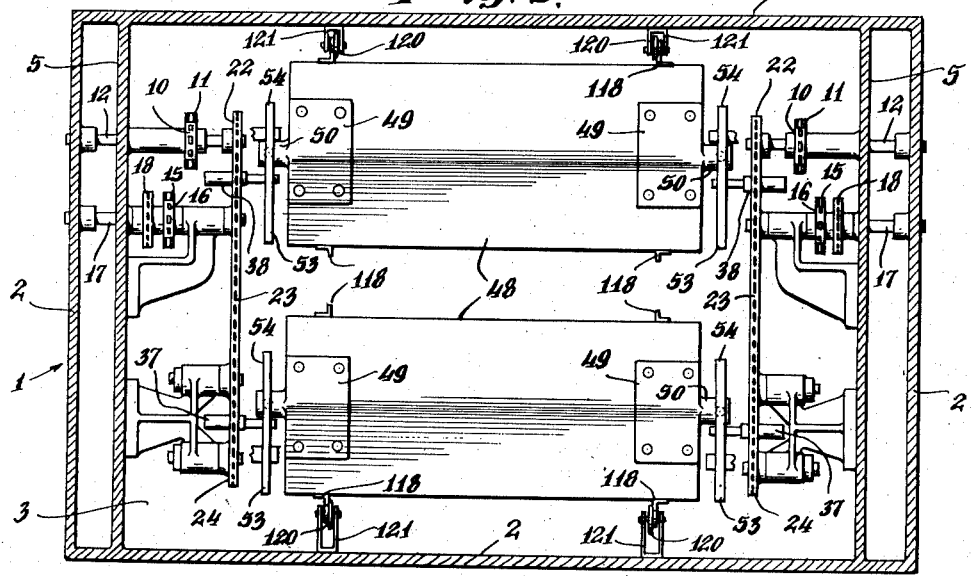
INVENTOR.
Peter Stabile
BY Abraham Aaron
ATTORNEY.

July 14, 1953          P. STABILE          2,645,367
POWER-DRIVEN AUTOMOBILE LIFT
Filed April 7, 1948          4 Sheets-Sheet 4
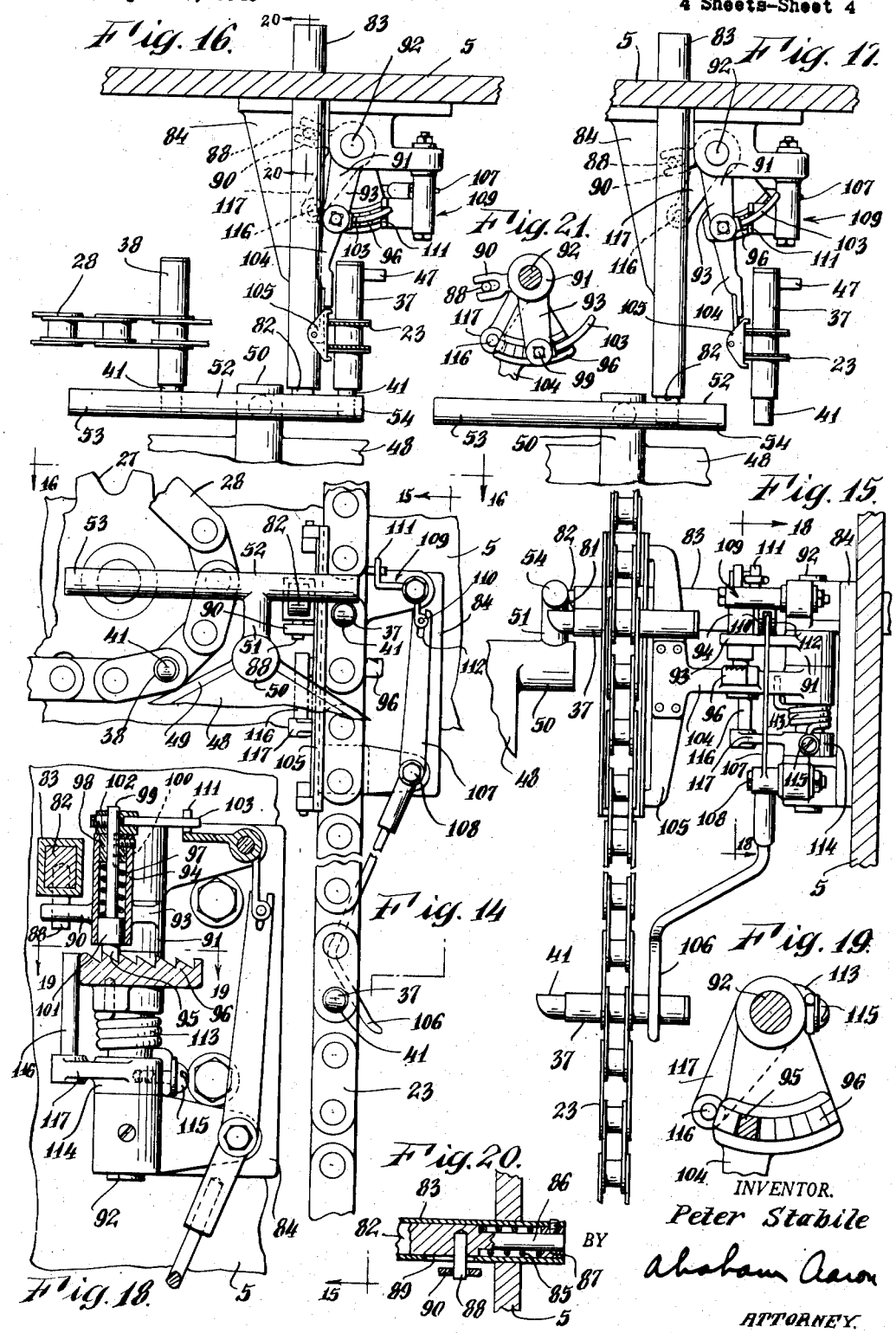
INVENTOR.
Peter Stabile
BY
Abraham Aaron
ATTORNEY.

Patented July 14, 1953

2,645,367

UNITED STATES PATENT OFFICE 2,645,367

POWER-DRIVEN AUTOMOBILE LIFT

Peter Stabile, Brooklyn, N. Y.

Application April 7, 1948, Serial No. 19,593

2 Claims. (Cl. 214—16.1)

The purpose of my invention is to create a lifting means for automobiles to any floor or roof of a building and also for storing automobiles. A box retaining the automobile is used to lift the automobile.

In addition to lifting automobiles and housing them, my device may be used for storing purposes.

Referring to the drawings which illustrate my invention:

Figure 2 shows a section taken on the line 2—2 of Fig. 1 showing the automobile parking device in a fragmentary side elevation.

Figure 3 is a section taken on the line 3—3 of Fig. 2.

Figure 4 is an enlarged fragmentary view of the upper left exchanging means.

Figure 5 is a section taken on the line 5—5 of Fig. 4.

Figure 6 is a section taken on the line 6—6 of Fig. 4.

Figure 7 is a side elevation of Fig. 4 showing the fork in moved position.

Figure 8 is a section taken on the line 8—8 of Fig. 2 showing the lower left exchanging means.

Figure 9 is a section taken on the line 9—9 of Fig. 8.

Figure 10 is a section taken on the line 10—10 of Fig. 8.

Figure 11 is a section taken on the line 11—11 of Fig. 8.

Figure 12 is a section taken on the line 12—12 of Fig. 11.

Figure 13 is a section taken on the line 13—13 of Fig. 2.

Figure 14 is an enlarged fragmentary view of the upper right exchanging means.

Figure 15 is a section taken on the line 15—15 of Fig. 14.

Figure 16 is a section taken on the line 16—16 of Fig. 14.

Figure 17 is a similar view to Fig. 16 but in moved position.

Figure 18 is a section on the line 18—18 of Fig. 15.

Figure 19 is a section on the line 19—19 of Fig. 18.

Figure 20 is a section taken on the line 20—20 of Fig. 16.

Figure 21 is a similar view to the Figures 16 and 17 but in moved position and a fragmentary view.

Figure 1:
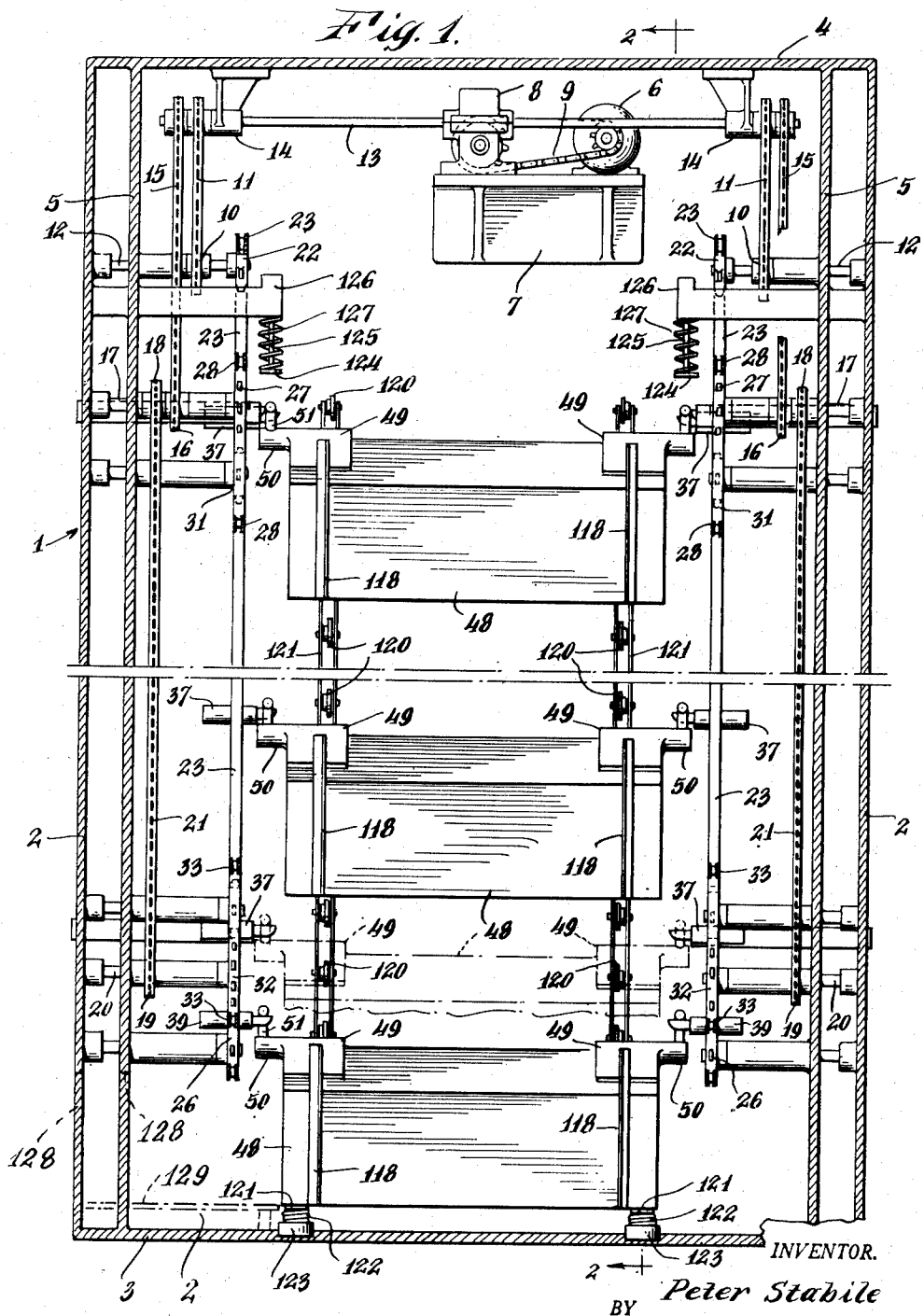
Figure 1 is a section taken on the line 1—1 of Fig. 2, showing the automobile lift in a fragmentary elevation with the drive-in opening.

Referring specifically to the drawings in which a power driven automobile lift also functions as an automobile parking device constructed so as to facilitate the maximum automobile parking in a minimum of space and is so arranged that the automobiles will be stored in a building 1 primarily of four walls, floor and ceiling 2, 3 and 4 respectively. The two inner walls 5 run the full length of the building and act as bearing supports.

In principle, the storage of the automobile is conducted in a continuous moving chain arrangement. A motor 6 is fastened to the bracket 7 extending inwardly near the ceiling of the building and drives a reducing box 8 through the chain 9. The said reducer in turn drives two sprocket wheels 10 by the chains 11, said sprocket wheels are journaled on the shafts 12. This is accomplished by a long shaft 13 extending from the reducer and held in the bearings 14 thus proving simultaneous drives on each side of the building. A second chain 15 drives from the sprocket on the end of shaft 13 to a sprocket 16 on the shaft 17 and sprocket 18 on the shaft 17 again drives the sprocket 19 on the shaft 20 through the chain 21. All the sprocket wheels in this chain drive are of the same diameter thus creating one speed on the shafts 12—13—17—20.

Journaled at the end of the shafts 12 are the sprocket wheels 22 which drive the actual lifting chains 23, said chains running on a horizontal plane to a second sprocket wheel 24 then down vertically to the sprocket 25, horizontally to a sprocket 26 and then back to the sprocket 22. This is called the slow drive.

Journaled at the end of the shaft 17 are the sprocket wheels 27 which are twice the diameter of sprocket 22 thus providing a drive exactly two times the speed of the chain 23.

A chain 28 drives horizontally to the sprocket 29 of the same diameter as the sprocket 27 then vertically to the smaller sprocket 30, then to the idler 31, thus completing the circuit. This is called the fast drive and is located near the upper section of the drive 23.

A further sprocket 32 journaled on the shaft 20, also has a diameter twice that of the sprocket 19 giving the chain 33 the same speed as the chain 28. The said chain drives the idler 34, then the sprocket 35 and vertically to the sprocket 36, then returns horizontally to the sprocket 32. This drive is located near the lower section of the drive 23 and is also known as the fast drive. All the drives are directly in line as may be seen in Fig. 1.

The links of the chain 23 are so constructed to permit a special pin 37 to be inserted approximately every seven feet of the length of the chain. A special pin 38 is also inserted in even progression on the chains 28 and 33 which carries a similar number of special pins 39.

The pins 37, 38 and 39 are of similar construction, consisting of a hollow shell 40, a plunger 41 having a cam 42 and turned down shank 43, the shoulder of which accommodates a spring 44. The other end of the spring bears against collar 45 which is placed at a desired distance in the hollow shell 40 and held in place by a set screw 46. The pins 37 and 39 carry a cross pin 47 which extends at right angles from the opposite end of the hollow shell 40. A plurality of automobile and storage carriers 48 are provided, each one being carried by a pin 37 during vertical travel. The said carriers are of a suitable construction to accommodate a standard size automobile or light commercial truck. The ceilings are angular ending at the peak in a strong bracket 49 at each end. Each of said brackets 49 carries a strong extending lug 50 surmounted by a vertical rod 51 which in turn carries a cross bar 52, the two arms of which are of different lengths 53 and 54. The cross bars 52 rest on the pins 37 in vertical upward and downward movements. It will be seen in Fig. 2, that when the carriers 48 are on the downward passage, the long end 53 rests on the pin 37 and on upward passage the short end 54 rests on the pin 37.

As the carrier is brought over the chain 28 it is carried on the cross bar 52 by the pin 38 at twice the speed as the chain 23 over the sprocket 29 and then downward vertically to a point where the cross bar will come to rest on a rectangular bar 55 which is housed in a shell 56, anchored horizontally in the wall 5 by the bracket 56'. The said bar is provided with a rack 57 at its lower surface which engages with the gear wheel 58 on the shaft 59, the said gear wheel being of the same ratio and integral with the gear 60, loose on the stud 59, which is in mesh with a segment gear 61 on the shaft 62. Opposite the segment gear but integral with it is a fork member 63 of suitable curved form. As the pin 37 of the chain 23 rides downward and is forced over the pin 52, the cross pin 47 will engage the slot of the fork 63 driving it downward around the shaft 62, actuating the gears 61 and 60 thus pulling in the bar 55 into its housing. At the same instant of release of the bar 55 on the cross bar 52 the plunger 41 of the pin 37 will slip over the surface of bar 52 and by pressure of the spring 44 will snap under the bar 52 thus continuing the downward movement of the carrier 48. Upon release of the pin 47 from the fork 63, a strong coil spring 64 on the shaft 62 will return fork upward to its normal position against the stop pin 64' on the housing 56. This movement is exemplified in Figs. 4-5-6-7.

After continuing downwardly, the cross bar 52 will come to rest on the rectangular bar 65 which is a part of a similar movement as explained in Figures 4-5-6 but in reverse. The pin 39 of the chain 33 will come around the sprocket 35 and downward. The cross pin 47 of the pin 39 will engage the slot of the curved fork 66 which again is integral with a segment gear 67, loose on the stud 68. The said segment meshes with a gear 69. The gear 69 is integral with the gear 71 which is in mesh with the rack 72 on the undersurface of bar 65. It will be seen that the bar 65 will again be forced into the shell 73 which is anchored to the wall 5 by the bracket 74 thus releasing the cross bar 52. At this same instant the plunger 41 of the pin 39 will have slid around the surface of the bar 52 and by action of the spring 44 will go under the bar 52. Upon release of the pin 41 from the fork 66, the strong coil spring 75, will force the fork upward thus pulling the bar 65 out of its shell and ready to receive the next cross bar 52.

Upon traversing the length of the horizontal portion of the chain 33 at high speed, the carrier is brought around the sprocket 32 and then upward vertically. After passing over the center of the sprocket 32, the cross bar 52 will engage the cam surface 76 of the rectangular bar 77 thus forcing the bar into its shell 78 which is horizontally anchored in the wall 5 by the bracket 79. A spring 80 takes up the distance required for passage of the cross bar 52. Upon full passage of the cross bar 52 the bar 77 will be forced out again and under the cross bar thus holding it, whereupon the pin 39 of the chain 33 has turned sufficiently around the sprocket 32 to disengage its action on the cross bar 52. The pin 37 of the chain 23 will against come up and take along the cross bar 52 on its vertical climb in low speed.

Upon completion of the vertical climb of the cross bar 52 on the pin 37, the cross bar again comes into contact with a cam surface 81 of the rectangular bar 82 thus forcing the bar 82 into its housing 83 which is horizontally anchored to the bracket 84 on the wall 5. A coil spring 85 straddles the turned shank 86 of the bar 82 at its farther end and is held in place by the collar 87. The motion of the bar 82 contracts the spring 85 against the collar 87. By this same motion a pin 88 depending from the undersurface of the bar, and riding in the slot 89 of the housing 83 will force a fork 90, integral with the crank arm 91, which is pivoted on a stationary shaft 92, in a rearward direction. The other arm 93 of the crank arm 91 carries at its end a vertical housing 94 which houses a squared pawl 95. Said pawl 95 rides against a segment ratchet 96 by action of the coil spring 97 against the collar 98 and the pawl 95. The shank 99 of the pawl is slotted at 100 to engage the set screw which also holds the collar 98 thus preventing the pawl from turning on its main body 101. The upper end of the shank 99 has keyed to it a collar 102 which is integral with a curved rod 103. As the crank arm 91 is turned into a clockwise direction the pawl will engage each tooth of the segment. A horizontal arm 104 extending from the ratchet 96 carries a long vertical pusher member 105 which is of slightly larger width than the chain 23 and directly against it. Upon release of the bar 82 from the cross bar 52, Fig. 17, said bar will take up its normal position by action of the spring 85 thus turning the crank arm 91 in counterclockwise direction. The pawl 95 will carry along the ratchet 96 and the pusher 105 will move the chain 23 away from the natural vertical position thus releasing the pin 41 from the cross bar 52. Following this action the next lower pin 37 on the chain 23 forces the cam rod 106 of the crank arm 107 around the pivot 108. A crank member 109 having two extending forks 110 and 111, is pivotally mounted to the main bracket 84. The said forks 110 and 111 are turned in clockwise direction by action of the end of the arm 107 against the pin 112 in the fork 110. The fork 111 will then force the curved rod 103 upwardly, pulling along the pawl 95 against the spring 97 thus releasing the pawl from the ratchet. The ratchet 96 will then turn in clockwise direction by action of the coil spring 113 which has one end anchored at a stationary collar 114 held against the shaft 92 by the set screw 115 until the said ratchet abuts against the vertical rod 116 extending from the arm 117 of the collar 114, Figures 18 and 21. It will now be seen that the arrangement is now reset from the next cross arm 52 to engage the bar 82 and repeat the foregoing procedure.

It is quite apparent from the drawings that the cross bar 52 when in engagement with the pins 37, 38, and 39 is not supported at the center thereof. To counteract this state of unbalance, each carrier 48 is provided on each side thereof with two angle rails 118 extending the full height of the carriers and having the ends rounded at 119. As the carriers proceed downward on pins 37 in low speed they would naturally swing to the left, therefore, a series of rollers 120 are provided on the wall 2 rotatably mounted on the brackets 121 which engage the rails 118 on the left side of the carriers thus providing balance. As the carriers proceed to the horizontal plane of the chain 33 in high speed, two slide plate members 121 are suspended from floor 3 by strong springs 122 which are anchored in the cups 123. As the carriers proceed the bottoms will slide along thus providing balance. The upward vertical travel of the carriers is accomplished in the same manner as the downward travel. As the carriers proceed to the upper horizontal plane, the tops of the cross bars 52 will engage similar plates 124 which are suspended by rods 125 from the brackets 126 extending from the side walls 2 and 5. The springs 127 butt against the plates and brackets, taking up the pressure as the carriers come to their full height and continue across in high speed. The rods 125 will recede into the hole in the brackets. The wall opening for the drive in is designated 128 and 129 the floor of the housing or carrier.

The carriers are approximately seven feet apart. The number of carriers are not limited. The size of the carriers may vary depending upon the tonnage required.

From the foregoing, it will be clear that the carriers are supported by transverse bars 52 which rest upon pins 37 and are therefore moved upwardly or downwardly in a vertical direction upon the travel of chain 23. Similarly, the carriers are supported and moved in a transverse or horizontal direction when resting upon pins 38 provided on chains 28. The transfer of the carriers from pins 37 to pins 38 and reversely from pins 38 to pins 37 is accomplished by permitting crossbar 52 to momentarily rest upon rectangular bar 55 until an appropriate pin travelling in a direction normal thereto picks up and supports said transverse bar 52 thereby altering the direction of travel of the carrier. The transfer of the carrier from horizontal travel when supported by chain 28 to vertical downward travel when supported by chain 23 is accomplished by permitting portion 53 of bar 52 to rest upon rectangular bar 55. As a pin 37 passes bar 53, the plunger 41 of said pin engages the surface of portion 53 of bar 52 and said plunger is moved inwardly engaging fork 63 and causing rectangular bar 55 to be retracted as pin 37 passes bar 53 so that when plunger 41 is caused to be moved outwardly by means of spring 44 it snaps under portion 53 of bar 52 thereby effectively transferring the support of the carrier to chain 23.

Although the drawings and specification disclose the best manner in which I have contemplated embodying my invention, I desire in no way to be limited to the details of my disclosure. Further slight changes in proportions may be made without departing from the spirit of my invention within the broad scope of the appended claims.

I claim:

1. A power lift and storage device for automobiles, comprising a frame having at least two opposing parallel support members, sprocket wheels rotatably carried by said supports, a sprocket chain belt carried by said sprocket wheels to form a continuous loop in the plane of each of said supports, inwardly extending projecting pins secured to said chains along spaced intervals thereof, a plurality of vehicle carriers, transverse bars secured to each end of said carriers said bars being adapted to rest upon said pins whereby said carriers are dependingly supported between said supports upon said pins for movement in a vertical direction upon the travel of said chains, second sprocket wheels rotatably carried by said supports located within the area defined by said first chain loops, second sprocket chains carried by said second sprocket wheels forming additional continuous loops in the plane of each of said supports located adjacent the upper and lower portions of said first chains, inwardly extending projecting pins secured to said second chains along spaced intervals thereof adapted to dependingly support said carriers by means of said transverse bars for movement of said carriers in a horizontal direction upon the travel of said second chains, means including a reciprocable bar interposed between said first and second chains for transferring said carriers for movement in a continuous loop and power means for imparting movement to said chains through said sprocket wheels.

2. The device according to claim 1 wherein said transfer means comprises a reciprocable bar interposed between said first and second chains adapted to momentarily support said carrier upon completion of its movement in one direction by means of one of said chains and until the supporting pin of the other of said chains abuts with and supports said carrier.

PETER STABILE.

References Cited in the file of this patent
UNITED STATES PATENTS

| Number | Name | Date |
|---|---|---|
| 1,782,410 | Cook | Nov. 25, 1930 |
| 1,815,738 | MacDonald | July 21, 1931 |
| 1,871,795 | James | Aug. 16, 1932 |
| 2,024,190 | Sumi et al. | Dec. 17, 1935 |